United States Patent
Cooper

(10) Patent No.: US 10,066,928 B1
(45) Date of Patent: Sep. 4, 2018

(54) NUT MEASURING DEVICE

(71) Applicant: George Cooper, Corpus Christi, TX (US)

(72) Inventor: George Cooper, Corpus Christi, TX (US)

( * ) Notice: Subject to any disclaimer, the term of this patent is extended or adjusted under 35 U.S.C. 154(b) by 74 days.

(21) Appl. No.: 15/286,881

(22) Filed: Oct. 6, 2016

(51) Int. Cl.
  *G01B 11/14* (2006.01)

(52) U.S. Cl.
  CPC ................ *G01B 11/14* (2013.01)

(58) Field of Classification Search
  CPC ........................................... G01B 11/14
  USPC .................... 33/706, 707, 501.09
  See application file for complete search history.

(56) References Cited

U.S. PATENT DOCUMENTS

| | | | | | |
|---|---|---|---|---|---|
| 4,138,820 | A * | 2/1979 | O'Connor | ............... | G01B 3/34 33/199 R |
| 5,875,558 | A * | 3/1999 | Bakke | .................... | G01B 3/38 33/199 R |
| 2005/0120575 | A1* | 6/2005 | Molmann | ............... | G01B 3/22 33/679.1 |
| 2007/0157484 | A1* | 7/2007 | Grubler | .................... | B25B 7/00 33/679.1 |
| 2008/0276475 | A1* | 11/2008 | Schafer | .................... | G01B 3/34 33/501.45 |
| 2009/0056160 | A1* | 3/2009 | Hu | ........................ | G01B 3/166 33/806 |
| 2010/0186250 | A1* | 7/2010 | Hu | ........................ | G01B 3/166 33/807 |
| 2012/0151788 | A1* | 6/2012 | Miller | ..................... | G01B 7/26 33/701 |
| 2016/0169654 | A1* | 6/2016 | Howard | .................. | G01B 3/20 33/783 |

\* cited by examiner

*Primary Examiner* — G. Bradley Bennett
(74) *Attorney, Agent, or Firm* — Gulf Coast Intellectual Property Group

(57) ABSTRACT

A nut measuring device that is configured to be surroundably mounted a nut so as to measure and subsequently display the size thereof. The nut measuring device includes a body having a first end and a second end. The first end of the body includes an opening wherein the opening is contiguous with a channel. The channel extends inward into said body and includes a hollow passage. A plurality of sensors are circumferentially mounted to the channel and extend the entire length thereof. The sensors are configured to detect and provide measurement of a nut adjacent thereto. A processor is operably coupled to the plurality of sensors and receives data signals therefrom. A display screen is formed in the outer surface of the body and is operably connected to the processor. The display screen displays the size of the nut disposed in the channel.

18 Claims, 2 Drawing Sheets

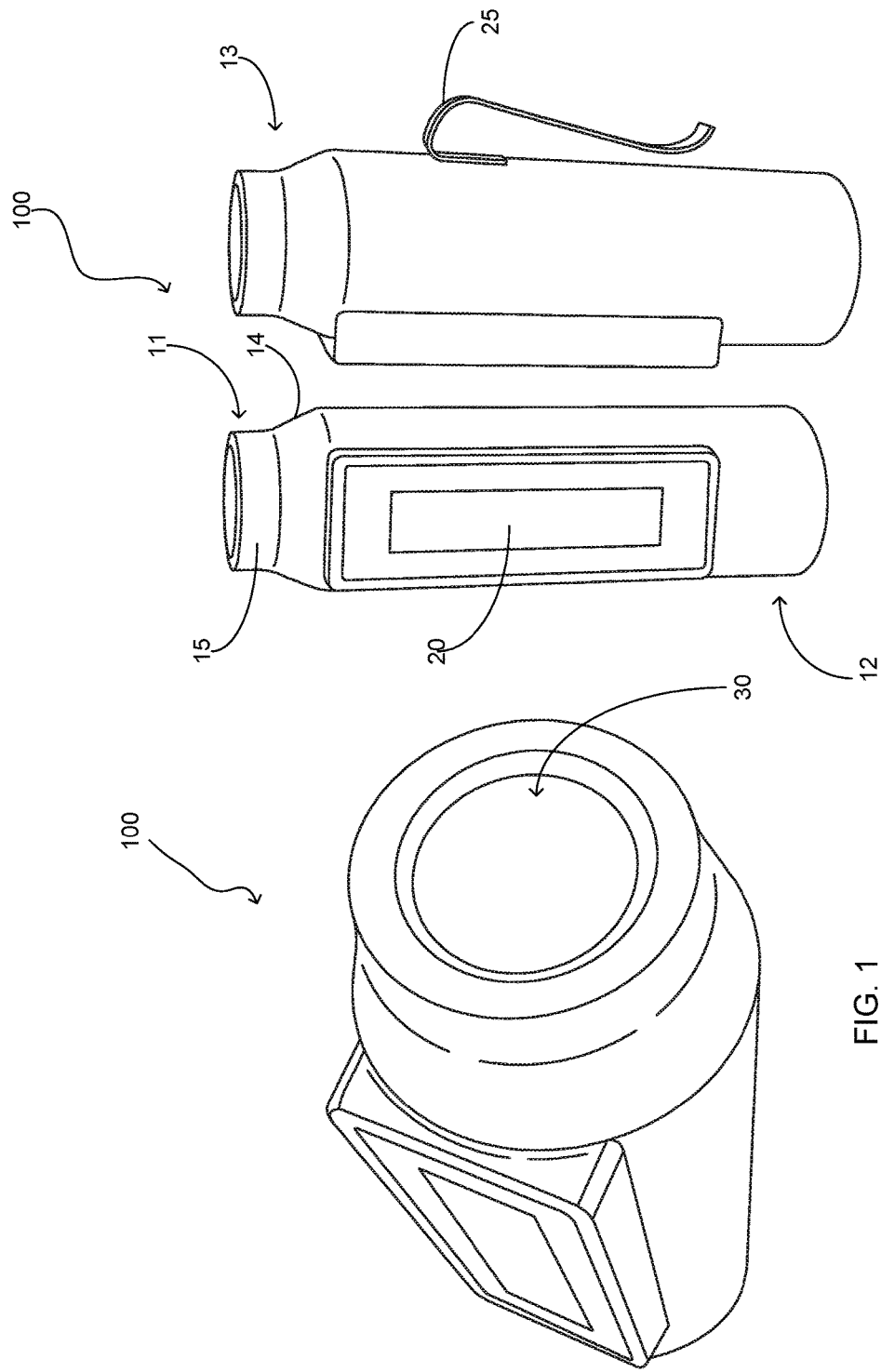

NUT MEASURING DEVICE

PRIORITY UNDER 35 U.S.C. SECTION 119(e) & 37 C.F.R. SECTION 1.78

This nonprovisional application claims priority based upon the following prior United States Provisional Patent Application entitled: Hardware Accessory, Application No. 62/276,757 filed Jan. 8, 2016, in the name of George Cooper, which is hereby incorporated by reference for all purposes.

FIELD OF THE INVENTION

The present invention relates generally to tools, more specifically tool accessories wherein the present invention is configured to precisely measure a nut so as to provide the information to a user as to the size of wrench and/or socket that is required to either remove or secure the nut to/from a bolt.

BACKGROUND

Millions of application utilize conventional nuts and bolts to secure elements of objects together. Nuts and bolts are utilized in the construction of items such as but not limited to chairs, desks and mechanical items such as but not limited to motors and other vehicular hardware. As is known in the art when attempting to remove a nut from an object it is common to use either a box wrench or a socket secure to a ratchet. Most users will visually inspect the nut to be removed and then attempt to guess the size of the nut and retrieve the appropriate sized wrench or socket.

The problem with the aforementioned technique is that it is very common for an individual to incorrectly guess the wrong size and as such retrieve the incorrect size tool. This wastes time as individual find themselves going through two to three wrenches and/or sockets before finding the correct size. This provides frustration to the average individual but this adds time to a professional and as such results in a less efficient operation for a business such as but not limited to an automotive repair shop.

Accordingly, there is a need for a nut measuring device that can quickly read and display the size of the nut engaged therewith so as to provide the specific nut size to the individual in order to allow the individual to utilize the correct size wrench and/or ratchet.

SUMMARY OF THE INVENTION

It is the object of the present invention to provide a nut measuring device that is configured to be superposed a nut and provide a display of the size of the nut on a display screen.

Another object of the present invention is to provide a nut measuring device that includes a body that is manufactured from a rigid material wherein the body has integrally formed therewith a LCD display screen.

A further object of the present invention is to provide a nut measuring device configured to provide the size of a nut engaged therewith wherein the body includes a channel centrally disposed therein.

Still another object of the present invention is to provide a nut measuring device operable to provide a size of a nut that has been engaged therewith that includes a plurality of sensors circumferentially disposed around the channel.

An additional object of the present invention is to provide a nut measuring device that is operable to provide the size of a nut wherein the channel is of sufficient length to receive a portion of a bolt therein so as to be able to surround a nut thereon.

Yet a further object of the present invention is to provide a nut measuring device that is configured to surroundably mount nuts of various different sizes and provide the size thereof that further includes a processor and a power supply disposed therein.

Another object of the present invention is to provide a nut measuring device that is configured to surroundably mount a nut and display the size thereof on a display screen wherein the body further includes a receptacle that is configured to be operably coupled to a socket wrench.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

FIG. 1 is a an end perspective view of the present invention; and

FIG. 2 are side views of the present invention; and

DETAILED DESCRIPTION

Figure 3:
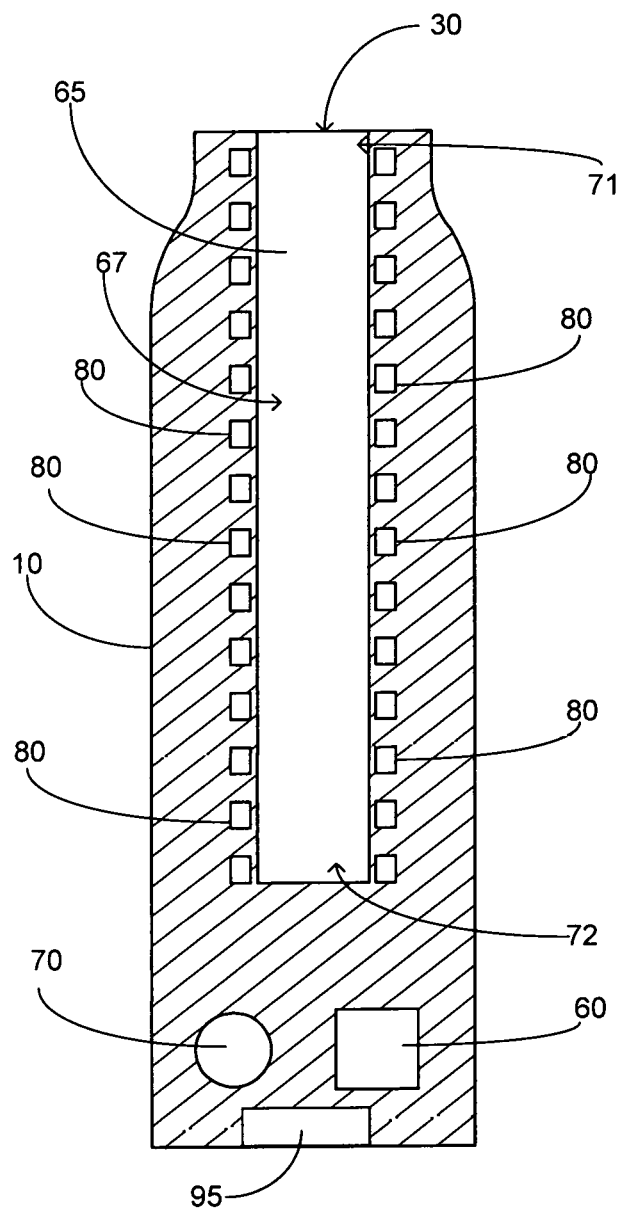
FIG. 3 is a cross-section view of the present invention.

Referring now to the drawings submitted herewith, wherein various elements depicted therein are not necessarily drawn to scale and wherein through the views and figures like elements are referenced with identical reference numerals, there is illustrated a nut measuring device 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular FIG. 1 herein, the nut measuring device 100 includes a body 10 wherein the body is manufactured from a suitable rigid and durable material such as but not limited to plastic or metal. The body 10 includes first end 11 and second end 12. First end 11 is formed with a tapered section 13. The tapered section 13 includes a first portion 14 and second portion 15 wherein the second portion 15 has a diameter that is less than that of the body 10. This configuration provides assistance in superposing the body 10 over a nut that may be in an area that has obstructions adjacent thereto. While the height of the second portion 15 is illustrated as a specific height herein, it is contemplated within the scope of the present invention that the second portion 15 could be manufactured with alternate heights in order to adapt the nut measuring device 100 for various applications.

The body 10 includes a display screen 20 integrally formed therewith. The display screen 20 is operable to display the nut size to a user of the nut measuring device 100 of the nut with which the nut measuring device has been engaged. While no particular type of display screen 20 is required, good results have been achieved utilizing a LCD display screen. It is further contemplated within the scope of the present invention that the display screen 20 could be manufactured in alternate sizes and shapes in addition to the size and shape illustrated herein. The body 10 further includes clip 25. Clip 25 is a resilient metal clip that is secured to the body 10 utilizing suitable durable techniques. The clip 25 functions to allow a user to releasably secure the nut measuring device 100 within a shirt pocket or on a tool belt so as to provide easy access thereto.

Formed in first end 11 is opening 30. Opening 30 is formed so as to provide access to channel 50 so as to provide the ability for the nut measuring device 100 to be superposed a nut. It is contemplated within the scope of the present invention that the opening 30 could be formed in alternate sizes so as to be adapted for larger or smaller applications.

Referring in particular to FIG. 3 herein, a cross-sectional view of the nut measuring device 100 is illustrated therein. Disposed within the body 10 is a power supply 70. The power supply 70 provides the necessary power for the operation of the nut measuring device 100. While no particular power supply is required, it is contemplated within the scope of the present invention that the power supply 70 could be a lithium ion battery. The power supply 70 is electrically coupled to the processor 60 and sensors 80. Processor 60 is a conventional microprocessor that contains the necessary electronics to store, receive, transmit and manipulate data. The processor 60 is operably coupled to the sensors 80 and the display screen 20. Signal data from the sensors 80 is received and interpreted by the processor 60 which subsequently transmits a signal to the display screen 20 so as to provide a user the information as to the size of the nut, which has been placed in channel 65 as further discussed herein.

Channel 65 is accessed via opening 30 and includes hollow passage 67. The channel 65 extends substantially the length of the body 10. The channel 65 is configured to be substantially the length of the body 10 so as to allow a portion of a bolt to propagate the hollow passage 67 in order to allow a nut enter the channel 65 sufficiently so as the size thereof can be detected by the sensors 80. While no particular length of the channel 65 is required, it is contemplated within the scope of the present invention that the channel 65 be manufactured to a length of at least three inches. It is further contemplated within the scope of the present invention that the channel 65 be manufactured in alternate diameters. While no particular maximum diameter is required, it is contemplated providing a channel 65 that is up to two inches in diameter is desirable. It is further contemplated within the scope of the present invention that alternate models of the nut measuring device 100 could be manufactured wherein the models are sized for alternate application such that larger applications, e.g. large diesel equipment repair would have a channel 65 of greater diameter than a model configured for smaller applications such as small motor repair.

Still referring to FIG. 3 herein, a plurality of sensors 80 are circumferentially mounted around the channel 65. The sensors 80 are further disposed along the entire length of the channel 65 intermediate the first end 71 and second end 72 thereof. The sensors 80 are conventional photo sensors such as but not limited to infrared sensors and are operable to measure the distance between the sensor 80 and the surface of a nut that has been disposed within the channel 65. Once the aforementioned distance has been obtained from all of the sensors 80 circumferentially adjacent to a nut, the sensors 80 transmit data signals to the processor 60 wherein the processor 60 subsequently calculates the size of the nut and displays the size thereof on the display screen. It is contemplated within the scope of the present invention that the nut measuring device 100 is configured to provide nut sizes for both metric and standard size nuts. It is further contemplated within the scope of the present invention that the sensors 80 could be alternate types of sensors in addition to the photo sensors as described herein and still achieve the desired functionality.

Formed in end 12 of body 10 is receptacle 95. Receptacle 95 is formed in body 10 utilizing suitable techniques and is operable to engage the drive square of a conventional socket wrench. The receptacle 95 allows a user to couple the nut measuring device 100 to a socket wrench so as to provide an alternate option that may be required in order to engage the nut measuring device 100 with a nut so as to provide a measurement of the size thereof. It is contemplated within the scope of the present invention that the receptacle 95 could be provided in alternate sizes so as to operably coupled with square drives of different sizes.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A nut measuring device comprising:
   a body, said body having an outer surface, said body having a first end and a second end, said body being manufactured from a rigid material, said body further including a channel, said channel having an opening proximate the first end of said body providing access to said channel, said channel having a hollow passage;
   a plurality of sensors, said plurality of sensors being circumferentially mounted around said channel, said plurality of sensors being mounted the length of said channel, said plurality of sensors configured to measure a size of a nut that has been disposed within said channel; and
   a display screen, said display screen being formed in the outer surface of said body, wherein said display screen is operable to display the size of the nut disposed within said channel.

2. The nut measuring device as recited in claim 1, wherein said plurality of sensors are photo sensors.

3. The nut measuring device as recited in claim 2, and further including a processor, said processor being disposed within said body, said processor being operably coupled to said plurality of sensors and said display screen.

4. The nut measuring device as recited in claim 3, wherein said body further includes a tapered portion, said tapered portion being proximate said first end of said body.

5. The nut measuring device as recited in claim 4, and further including a clip, said clip being secured to the outer surface of said body.

6. The nut measuring device as recited in claim 5, and further including a power supply, said power supply operable to provide power for said processor and said display screen.

7. A device configured to measure and display a size of a nut subsequent being engaged therewith comprising:
   a body, said body having an outer surface, said body having a first end and a second end, said body being manufactured from a rigid material, said body further including a channel, said channel being of a length that is less than that of said body, said channel having an opening proximate the first end of said body providing access to said channel, said channel having a hollow passage;
   a plurality of sensors, said plurality of sensors being circumferentially mounted around said channel, said plurality of sensors being mounted the length of said channel, said plurality of sensors configured to measure a distance between said plurality of sensors and a surface of a nut adjacent thereto;
   a display screen, said display screen being formed in the outer surface of said body, wherein said display screen is operable to display the size of the nut disposed within said channel; and
   a processor, said processor being disposed within said body, said processor being operably coupled to said plurality of sensors and said display screen.

8. The device configured to measure and display the size of a nut as recited in claim 7, wherein said plurality of sensors are photo sensors.

9. The device configured to measure and display the size of a nut as recited in claim 8, and further including a receptacle, said receptacle being formed in said second end of said body, said receptacle configured to be mateably coupled to a square drive of a socket wrench.

10. The device configured to measure and display the size of a nut as recited in claim 9, wherein said body further includes a tapered portion, said tapered portion being proximate said first end of said body, said tapered portion having a first section and a second section.

11. The device configured to measure and display the size of a nut as recited in claim 10, wherein the channel is at least three inches in length.

12. The device configured to measure and display the size of a nut as recited in claim 11, and further including a power supply, said power supply operable to provide power for said processor and said display screen.

13. The device configured to measure and display the size of a nut as recited in claim 12, and further including a clip, said clip being secured to the outer surface of said body.

14. A nut measuring device configured to be superposed a nut so as to measure and subsequently display the size thereof comprising:
   a body, said body having an outer surface, said body having a first end and a second end, said body being manufactured from a rigid material, said body further including a channel, said channel being of a length that is less than that of said body, said channel having an opening proximate the first end of said body providing access to said channel, said channel having a hollow passage;
   a receptacle, said receptacle being formed in said second end of said body, said receptacle configured to be mateably coupled to a square drive of a socket wrench;
   a plurality of sensors, said plurality of sensors being circumferentially mounted around said channel, said plurality of sensors being mounted the length of said channel, said plurality of sensors configured to measure a distance between said plurality of sensors and a surface of a nut adjacent thereto;
   a display screen, said display screen being formed in the outer surface of said body, wherein said display screen is operable to display the size of the nut disposed within said channel; and
   a processor, said processor being disposed within said body, said processor being operably coupled to said plurality of sensors and said display screen.

15. The nut measuring device as recited in claim 14, wherein the channel is at least three inches in length.

16. The nut measuring device as recited in claim 15, wherein said plurality of sensors are photo sensors.

17. The nut measuring device as recited in claim 16, wherein said body further includes a tapered portion, said tapered portion being proximate said first end of said body, said tapered portion having a first section and a second section.

18. The nut measuring device as recited in claim 17, and further including a clip, said clip being secured to the outer surface of said body, said clip operable to releasably secure the nut measuring device to a desired article.

* * * * *